Jan. 24, 1950     L. E. SODERQUIST     2,495,663
APPARATUS FOR SHAPING AND VULCANIZING PNEUMATIC TIRES
Filed July 25, 1946     7 Sheets-Sheet 1
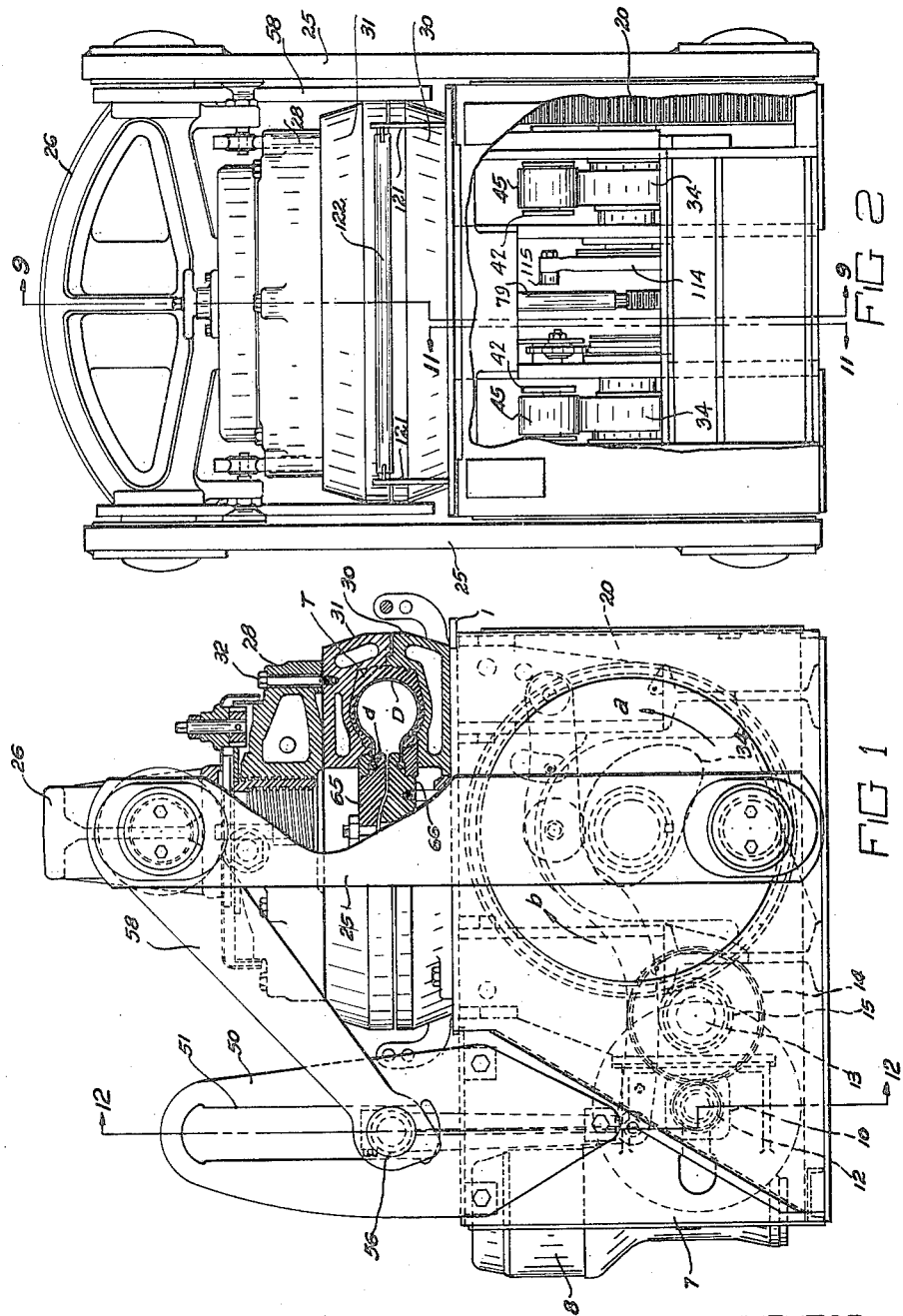
INVENTOR
LESLIE E. SODERQUIST
BY Ely & Frye
ATTYS.

Jan. 24, 1950   L. E. SODERQUIST   2,495,663
APPARATUS FOR SHAPING AND VULCANIZING PNEUMATIC TIRES
Filed July 25, 1946   7 Sheets-Sheet 2
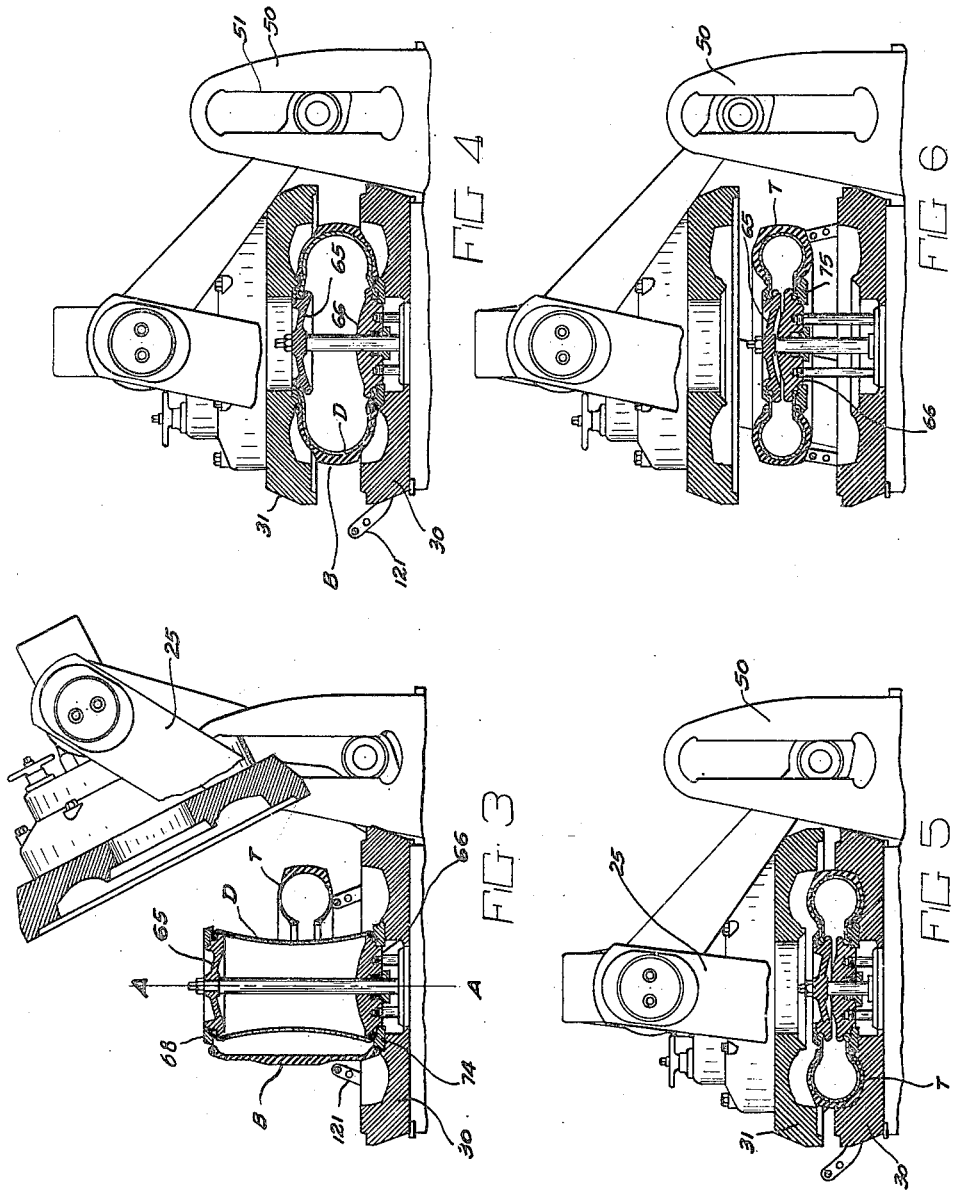
INVENTOR
LESLIE E. SODERQUIST
BY Ely & Frye
ATTYS.

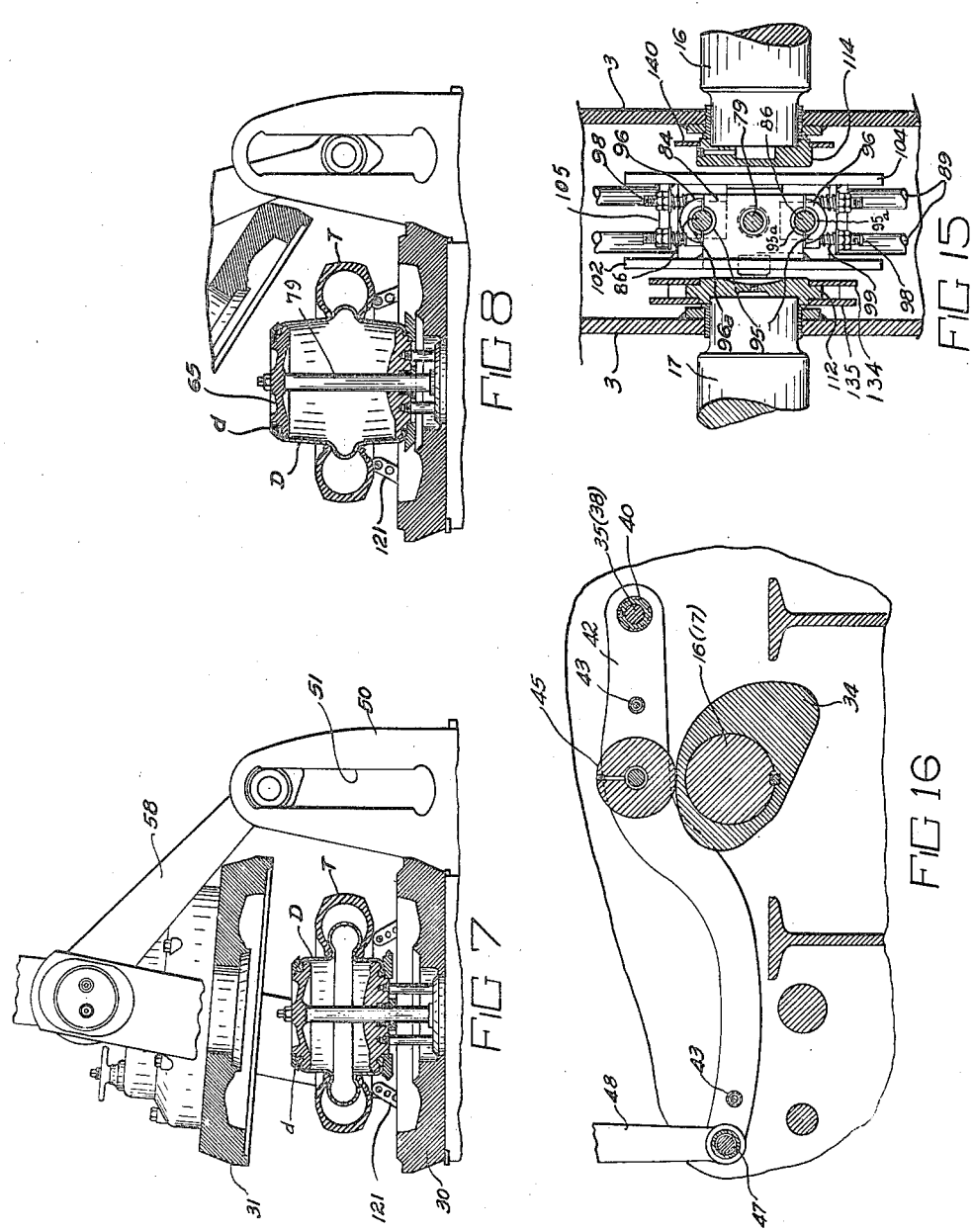

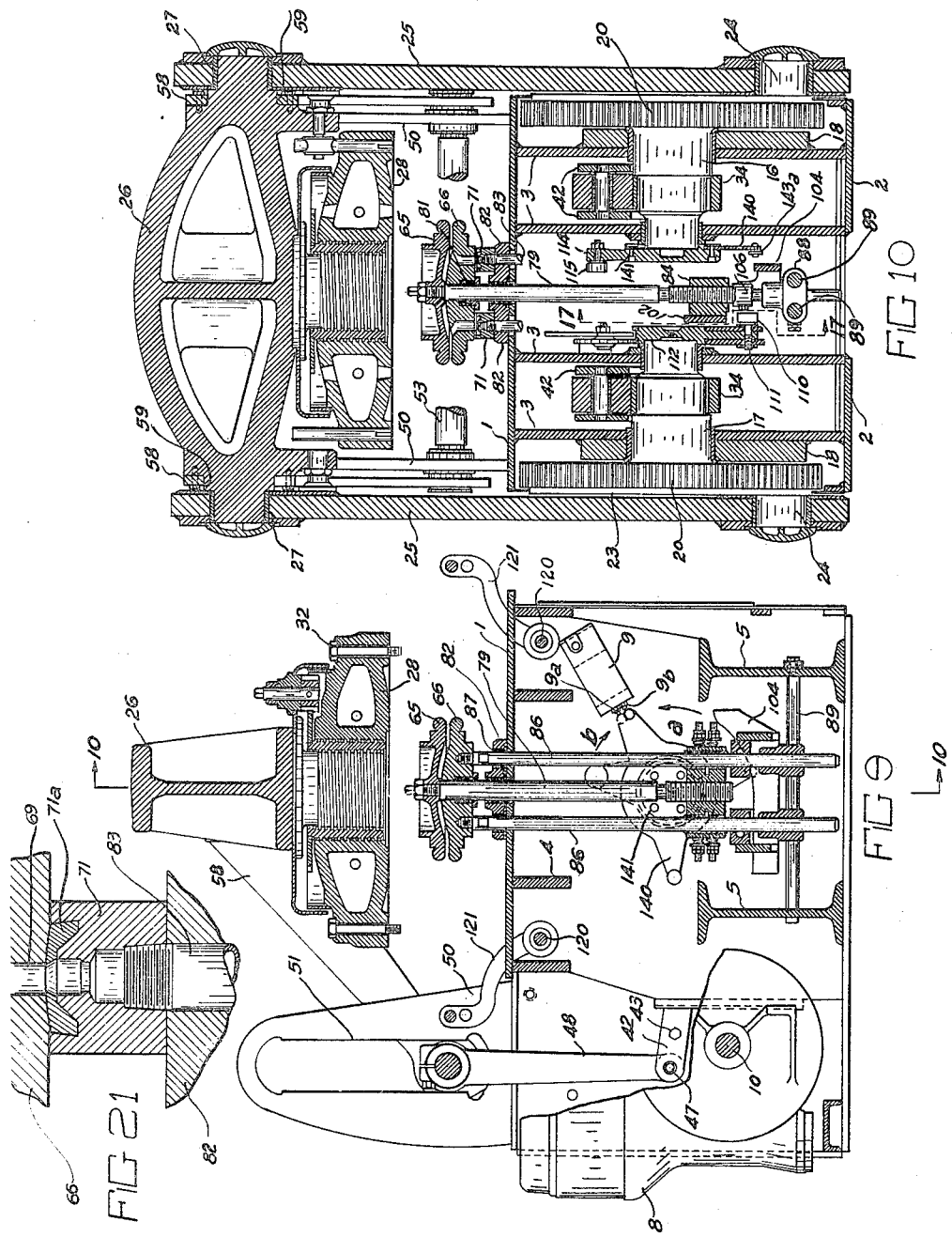

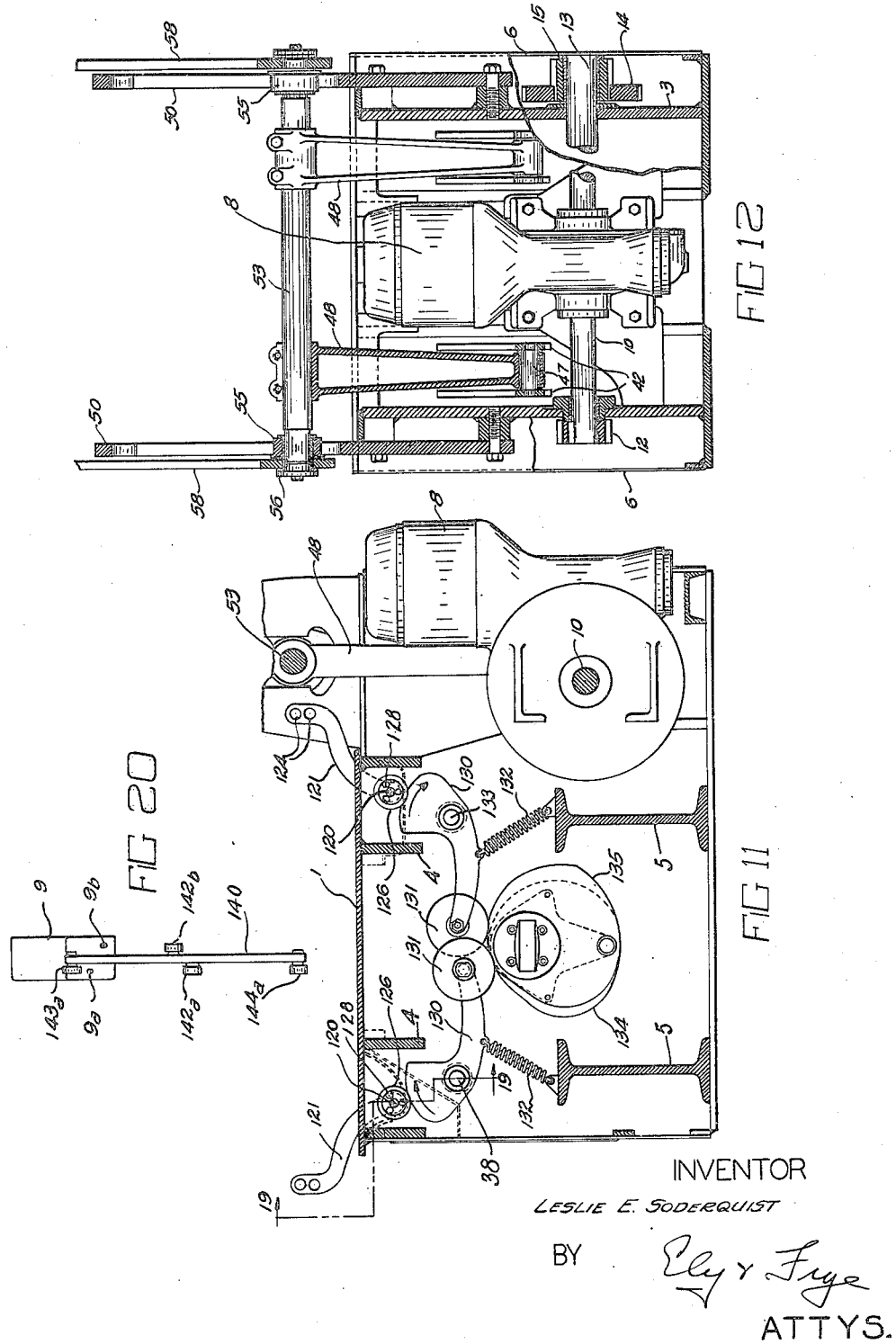

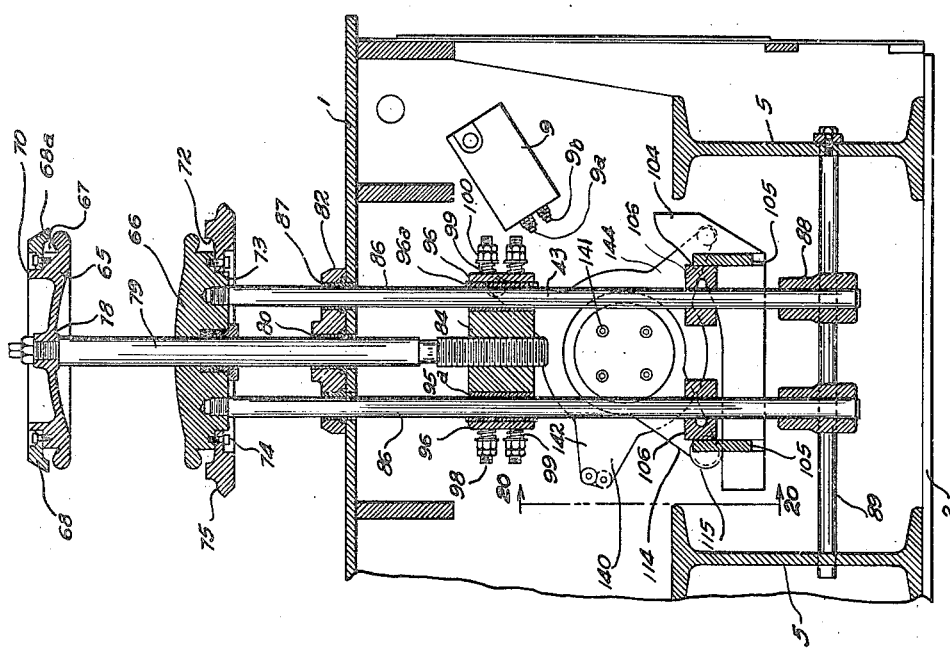

INVENTOR
LESLIE E. SODERQUIST

Patented Jan. 24, 1950

2,495,663

UNITED STATES PATENT OFFICE 2,495,663

APPARATUS FOR SHAPING AND VULCANIZING PNEUMATIC TIRES

Leslie E. Soderquist, Akron, Ohio, assignor to The McNeil Machine and Engineering Company, Akron, Ohio, a corporation of Ohio Application July 25, 1946, Serial No. 686,120

40 Claims. (Cl. 18—17)

The present invention is directed to apparatus for simultaneously shaping and vulcanizing pneumatic tires. The long established practice in this art has been to make the uncured tire in the form of an endless flat or semi-flat band, shape the band into the approximate form of the finished tire, and then insert a so-called air-bag. The assembly of air-bag and uncured tire is then placed in a press where the vulcanization is carried on while the air bag is maintained under a substantial internal pressure. After vulcanization is complete the tire and air-bag are removed from the press and the air-bag removed from the tire.

The apparatus shown and described herein operates upon the principle of mounting a flexible diaphragm or "blanket" between two relatively movable heads or rings in the press. The flat uncured band is placed over the diaphragm and as the press is closed the rings are caused to approach and at the same time the beads of the tire casing are forced together and the diaphragm distended. This joint action causes the tire band to be formed into tire shape within the mold. When the press is closed vulcanization proceeds as usual, the diaphragm or "blanket" constituting a practical and efficient substitute for the conventional air-bag and being inflated so as to exert the requisite internal pressure on the tire during the curing operation.

After the curing is completed, the press is opened and the rings are moved so that the tire is removed from the mold sections and the diaphragm stripped from the interior of the tire. While these operations are being carried on tire supporting arms are moved beneath the cured tire so as to receive the tire after the diaphragm is stripped therefrom and maintain the tire out of contact with the lower heated mold section.

It will be seen that the apparatus shown herein is a practical and efficient device by which the labor and expense of separately bagging and debagging a tire are eliminated. It is in the nature of an improvement over applicant's prior Patents Nos. 2,296,800 of September 22, 1942 and 2,337,857 of Dec. 28, 1943.

In the drawings the best known and preferred form of the invention is illustrated in sufficient detail to enable one skilled in the art to practice the invention, but it will be understood that adherence to details and to the specific design of the several operative parts thereof is not essential and that changes and modifications may be made in specific embodiments of the invention.

A particular type of mold moving mechanism has been shown to illustrate the preferred form of press with which the invention is adapted to be used, but other types of presses may be adapted to the invention. Specifically, the press shown herein is a toggle-type press in which the lower mold section remains stationary, but these details are not essential for the relation of movable and stationary sections may be reversed, or, as a further alternative, both sections may be moved. Also any mechanism for opening and closing the press may be used. The movable mold section is so coordinated with its operating mechanism that it moves in a direct or axial line for a substantial distance at the end of the closing movement and at the beginning of the opening movement. The balance of the opening movement causes the movable mold section to swing upwardly and rearwardly away from the tire so that it does not interfere with the emplacement of the cured band on the removal of the completed tire. Again these details are not absolutely essential although they make for a more effiecient operation of the machine.

With the press there should be associated suitable starting, stopping and timing mechanism comprising suitable controls for admitting fluid pressure to and evacuating it from the diaphragm so that the tire will be shaped properly, evacuated after vulcanization and removed with safety from the press. The fluid pressure usually employed within a tire is superheated water at a very substantial pressure and it is necessary to provide adequate controls for the pressure so that the requisite functions may be carried on in proper sequence. However, such automatic controls and timing mechanisms form no part of the present invention, and as several different types of devices for performing these functions are well known in this art and available, it has not been considered necessary to illustrate them. The tire mold sections are heated in accordance with standard practice but, as the provision of suitable connections for this purpose is common practice in the art, these details have been omitted.

In the drawings:

Fig. 1 is a side elevation of a press of the preferred design incorporating the improved mechanism and showing the tire fully seated in the closed mold. Parts of this view are in section to show details of a preferred mold mounting.

Fig. 2 is a front elevation of the press, a part of the housing being removed to show the interior mechanism.

Figs. 3 to 8 inclusive illustrate the positions of the several portions of the mechanism at various stages or steps of the operation. In these views the details of the jacketed mold and mold mounting have been omitted for the sake of clearness.

Referring to views 3 to 8 in detail:

Fig. 3 shows the press fully opened and is a composite view, that portion of the view to the left of the line A—A showing an uncured tire band in position as at the beginning of the operation, and that portion to the right of A—A showing the cured tire at the end of the operation resting upon the tire support. Fig. 4 shows the press partially closed, the tire band being partially shaped. Fig. 5 shows the commencement of the opening movement with the upper mold section separated from the tire. Fig. 6 shows a later stage in the opening movement in which the tire is lifted from the lower mold, but the diaphragm is still in distended position. In this view the tire supporting arms are just moving into position beneath the tire. Fig. 7 shows the tire supporting arms in their innermost position and the diaphragm partially stripped.

Fig. 8 shows the completion of the diaphragm stripping operation.

Fig. 9 is a longitudinal vertical section through the press on the line 9—9 of Fig. 2, the mold sections and the diaphragm being omitted. This view shows the position of the parts when the mold is fully closed.

Fig. 10 is a section on the line 10—10 of Fig. 9.

Fig. 11 is a section on the line 11—11 of Fig. 2 showing particularly the mechanism for operating the tire supporting arms.

Fig. 12 is a vertical section on the line 12—12 of Fig. 1 showing the mechanism for operating the upper platen of the press so as to move the upper mold section in the manner described.

Fig. 13 is a view similar to Fig. 9 but showing both diaphragm supporting rings raised as the parts are located when in the position shown in Fig. 6.

Fig. 14 is a view similar to Fig. 13 but showing the rings in the position of Fig. 7.

Fig. 15 is a plan view of the actuating mechanism for the diaphragm supporting rings.

Fig. 16 is a detail vertical section showing the cam means for actuating the upper platen.

Figures 17, 18:
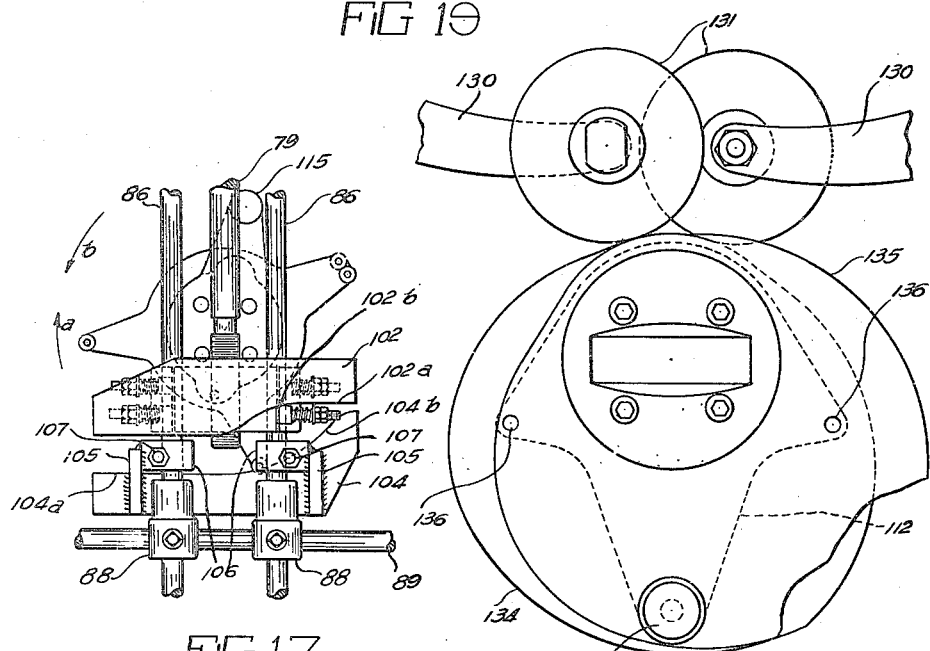

Fig. 17 is a vertical section on the line 17—17 of Fig. 10 looking to the right and Fig. 18 is a vertical section on the same line looking to the left. These views show the details of the mechanism for actuating the diaphragm rings.

Figure 19:
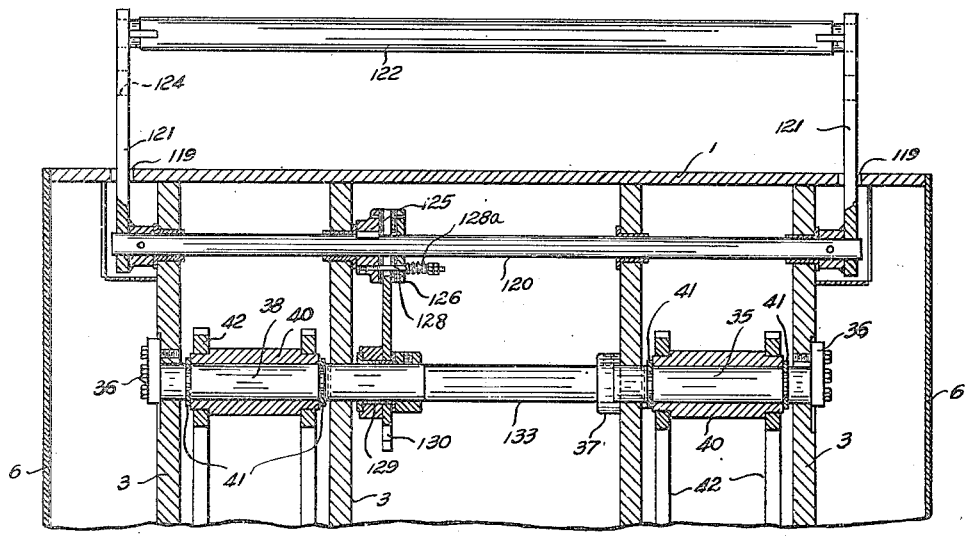

Fig. 19 is a vertical section showing the means for operating one of the tire supporting arms. This view is taken on the broken line 19—19 of Fig. 11.

Fig. 20 is an edge view showing the timer disk removed from the machine and showing it in an intermediate position. The point at which the view is taken is indicated by the line 20—20 on Fig. 14.

Fig. 21 is a view showing the details of the connection by which fluid under pressure is admitted to the diaphragm when the press is closed.

Throughout the drawings the unvulcanized tire band, composed of the usual carcass plies, tire beads and tread stock, is indicated by the letter B. When the band has been shaped and vulcanized it becomes the tire and is indicated at T. The diaphragm or "blanket," as it is sometimes called, is indicated by the letter D.

The housing

The press which has been illustrated as the specific embodiment of the invention comprises a base or housing which is in generally cubical form and is composed of numerous structural elements welded together which support the various operating mechanisms. Without attempting to describe all of the structural details, it may be stated that the housing comprises an upper bed plate 1 which constitutes the lower platen of the press, and lower base plates 2 which are connected by four vertical parallel webs 3 extending longitudinally of the housing and forming supports for the several machine parts. Transverse webs 4 located immediately below the bed plate brace the housing and two heavy transverse I-beams 5 located at the base of the housing and extending through the webs complete a rigid structure for supporting the operative parts of the press. Cover plates 6 are attached to the sides of the machine, being cut out to provide space for the connection with the main toggle links.

At the rear of the press and in a supplemental housing indicated by the numeral 7 is located the motor 8 which is preferably a reversible motor for operating the press in opposite directions for opening and closing the press. As indicated above appropriate circuits are adapted to control the operation of the motor in the proper timed relation, but these are not illustrated as they may be of any standard design. It is sufficient to state that the main controls are located in a control box 9 mounted in the housing as shown in Fig. 9. This control box has two operating switches 9a and 9b which are located at a point where they are operated by a moving part of the press, to be described. The switch 9a is a limit switch and is operated to open the circuit to the motor when the movable press platen reaches its upper and lower limits and also at an intermediate point. The switch 9b controls the circuit to the timing mechanism which is pressed inwardly during the period when the press is closed and governs the duration of vulcanization and the admission and evacuation of expanding fluid to the diaphragm, all in accordance with the specifications of the tire manufacturer. The machine is also equipped with starting and emergency switches as in standard practice, but these details are not illustrated.

The press operating mechanism

Actuated by the motor is the shaft 10 which extends through the housing and carries at either end a drive pinion 12. Each pinion 12 meshes with a gear 14 fixed to a smaller drive gear 15 on the end of a shaft 13 mounted in the vertical webs 3 of the housing (see Fig. 12).

Rotatably mounted in the right hand pair of webs 3 is one of the main drive shafts of the machine indicated by the numeral 16 and in the left hand pair of webs 3 is a companion main drive shaft 17 in alignment with shaft 16. These two shafts extend through reinforcing plates 18 attached to the outer webs 3 to opposite sides of the housing where each is attached to a large bull-gear 20. These bull-gears operate over an arc of approximately 210° in the direction of the arrow a in Fig. 1 beginning at the lowermost point when the press is opening. In closing the direction of rotation of the bull-gears is reversed as shown by the arrow b. A heavy bearing pin 24 projects from each bull-gear and on each pin is pivoted the lower end of a heavy main toggle link 25. These links span the press and in their upper ends are rotatably mounted in bearings 27 the cross head 26 which carries the upper platen 28 of the press. The connection between the cross head 26 and the platen 28 may be of any preferred type, but chosen for illustration is the mechanism covered in applicant's prior Patent No. 2,358,784 of Sept. 19, 1944, as a preferred form which gives means for adjusting the platens to accommodate molds of different thicknesses.

The lower mold section 30 is secured to the bed plate 1 and the upper mold section 31 is secured to the upper platen by bolts 32. The mold sections are heated in any approved manner. They may be cored out as shown in Fig. 1 for the circulation of steam or they may be housed within steam boxes in accordance with the preferences of the tire manufacturer.

The mechanism consisting of the bull-gears 20 and parallel toggle links 25 will raise and lower the upper platen with each partial revolution of the gears, but it is necessary to guide the upper ends of the links and to control the pivotal movement of the cross head during these operations in order to secure the desired movement of the upper or movable mold section. As stated above, it is preferred to move the upper mold section in a straight line both at the beginning of the opening movement and during the latter part of the closing movement in order to have the mold sections clear the tire properly. In the remainder of the movement, the cross head, with its mold section, is tilted so that the mold section is moved clear of the tire in order to give unrestricted access to the interior of the press. To accomplish these purposes the mechanism now to be described is preferred, although any other mechanism may be substituted therefor, provided it opens the space between the mold sections sufficiently.

Keyed to each main shaft 16 and 17 between the webs 3 is a cam 34 the configuration of which is shown in Fig. 16. Located between the right-hand pair of webs at the side of the cam is a short shaft 35 which is held in position by two cap plates 36 and 37 (Fig. 19). A companion shaft 38 is located between the opposite or left-hand pair of webs 3, but this shaft is extended toward the center of the machine to act as a bearing for one of the operating mechanisms for the tire supporting arm, as will be described. On each shaft 35 or 38 is a rotatable bearing 40 which is held in position by the two locking rings 41 seated in grooves in the shaft. On the ends of each bearing are two parallel arms 42 which are tied together by rods 43 and extend toward the rear of the press and over the cam 34. A roller 45 is journaled between the arms 42 and rests on the upper surface of the cam. The configuration of the cam 34 is such that during an arc of somewhat over 90° as the press is opening the arms 42 will move upwardly and from that point they will lower rapidly. These movements are translated to the cross-head in the manner to be described so as to give the requisite movement to the upper mold section.

The end of each pair of arms 42 is pivotally connected by a pin 47 to a vertical link 48. To the supplemental housing 7 at the rear of the press are bolted two vertical webs 50 which are cut out to provide the vertical guideways 51. The upper ends of the links 48 are clamped about a horizontal shaft 53 which extends through both guideways 51 where flanged rollers 55 are journaled to move over the guideways. The ends of the shaft 53 are extended beyond the webs 50 and are covered with cap plates 56 (Fig. 12). Between these cap plates and the rollers and over the ends of the shaft are pivotally received the ends of links 58 which extend from the shaft 53 to the cross head 26. At the cross head the links are fitted over reduced hubs 59 formed on the cross head adjacent the bearings 27. The connection between the ends of the links 58 and the cross head is a non-rotative one and is preferably obtained by bolting the upper ends of the links 58 to the cross head as indicated in Fig. 10.

The operation of the upper platen raising and tilting mechanism is as follows:

Starting with the press fully closed and the parts in the position shown in Figs. 1 and 16, the links 25 are in vertical position with the pins 24 at their lowermost positions. At this time the arms 42 are at their lowermost position with the rollers 45 on the low portions of the cams 34 as shown in Fig. 16.

As the press starts to open the cross head is elevated by the links 25 and, in pace therewith, the links 42, 48 and 58 and shaft 53 rise and as the rollers 55 are traveling in the guideways 51 at the same rate as the elevation of the cross head, the cross head will remain in vertical position. This condition will continue until the roller 45 passes over the high part of the cam which is not until the mold has opened with a direct vertical movement to an extent sufficient to fully clear the tire which as been elevated out of the mold. This is approximately at the point shown in Fig. 6 where the mold sections are at the greatest extent of separation while their faces are still parallel to each other. From this point on the shaft 53 is lowered rather abruptly and this in combination with the continued rise of the crosshead causes the links 25 to swing toward the rear of the press and cross head to rock, tilting the upper mold section upwardly and backwardly to the position shown in Fig. 3 where the entire assembly of tire and diaphragm is open and accessible so that the cured tire may be removed and a new uncured tire band inserted in its place. When this point is reached the movement of the press is arrested by the limit switch as will be described. On the closing movement the mold sections follow the same path which brings the upper mold section directly over the lower mold section with their faces parallel at a substantial distance from each other. This enables the mold to close directly over the tire without danger of pinching the uncured tire and insures an even register of the mold sections in closing. When the links 25 are at their lowermost point the motor is stopped for the interval determined by the timer. It is preferred to stop the movement of the press momentarily at an intermediate point in opening and closing, a feature which will be referred to in a later point in this specification.

*The diaphragm and its actuating mechanism*

The diaphragm D is preferably made from a rubber stock of substantially the same properties as the conventional air bag. It is relatively thin walled and sufficiently strong to withstand repeated deformations to which it is subjected in service. It is molded in sheet form with enlarged beads d along its edges by which it is clamped securely in the diaphragm supporting rings and when so mounted constitutes a fluid tight expansible chamber.

The diaphragm supporting rings referred to are an upper ring designated as a whole by the numeral 65 and a lower ring 66.

The upper ring is a disk, the outer edge of which is rounded and provided with a groove 67 in which one bead of the diaphragm is received. A clamping ring 68 is secured to the upper side of the ring over the groove and grips the bead $d$ firmly. The ring 68 is seated against a flange 70 projecting upwardly from the ring. When the mold is closed the outer beveled face 68a of the ring 68 registers with a correspondingly beveled seat in the upper mold section 31 and serves as a dowel.

The lower ring 66 has an oppositely faced groove 72 which receives the lower beaded edge of the diaphragm and over this groove and registered by a shoulder 73 is the lower diaphragm clamping ring 74. It will be noted that this ring 74 is somewhat wider than the upper ring and is formed on its upper edge with an angular seat 75 which constitutes a part of the tire molding surface for it covers the under side of the tire bead and a portion of its outer surface. This protruding ledge functions as a seat on which the tire band B rests when the band is placed in the press as shown in Fig. 3. It also serves as the lower abutment which holds the lower edge of the band in position when the upper edge is being forced downwardly by the upper mold half during the closing operation as shown in Fig. 4. After vulcanization has been completed and the mold opened the ledge 75 is the means by which the tire is lifted out of the mold as shown in Fig. 6.

The ring 66 is provided with means to admit fluid under pressure to the interior of the diaphragm. For this pupose the ring may be provided with two vertical passages 69 which discharge in the space between the diaphragm rings. On a plate 82 attached to the bed plate are two housings 71 having passages which register with passages 69 when the lower ring is on its seat in the lower mold section (Fig. 21). A gasket 71a seated in the top of the housing makes a fluid tight seal at this point and a conduit 83 is threaded into the housing, the other end of the conduit being attached to the source of the pressure fluid. The mold is thereby placed in communication with the fluid under pressure which flows into the diaphragm while the timer is operating.

The ring 65 has a central screw threaded boss 78 in which is received and clamped the threaded upper end of a vertical shaft 79. The shaft 79 is slidably received in a central passage in the lower ring 66 and also in a bushing 80 in the plate 82 secured to the top of the bed plate 1. A packing 81 is provided in the ring 66 to prevent the escape of the pressure fluid around the shaft 79. The lower end of the shaft 79 is threaded into the center of a block 84 which constitutes the lifting element for the diaphragm rings as will be described. The screw threaded connection between the block and the shaft 79 is for the purpose of adjusting the rings to varying distances for accommodating different tires.

The lower ring 66 is carried on the upper ends of two parallel shafts 86 on either side of the shaft 79. The shafts 86 are guided in bushings 87 in the plate 82 and extend alongside the block 84 against which they are frictionally held, as will be described. The lower ends of the shafts 86 are guided for vertical movement in sleeves 88 near the base of the press. As shown in Figs. 9, 10 and 17 these sleeves are carried upon and fixed to two parallel horizontal tie rods 89 secured in the transverse I-beams 5.

Starting with the press in open condition as shown at the left in Fig. 3, the ring 66 in its lowermost position is seated in the lower mold section 30 while the ring 65 is at the top of its stroke and the diaphragm is spread to its maximum extent. In this condition the band B is telescoped over the diaphragm and rests with its lower edge on the ring 74.

As the press starts to close, the upper mold section 31 moves into position so that it is above the lower mold section and parallel to it. The upper mold section then begins its descent in a straight line due to the action of the cam 34 as has been described and its first action is to contact the upper bead of the tire band and the ring 68. At this point the movement of the press is arrested momentarily but when the upper mold section resumes its downward movement the beads of the tire band are forced together and at the same time the diaphragm bellies out by the displacement of the air entrapped between the diaphragm supporting rings, or, if this is not sufficient to shape the diaphragm properly, some additional pressure may be admitted, but in substantially every case the entrapped air is sufficient to round out the diaphragm so that it follows the curvature of the forming band. The closing of the mold causes the upper diaphragm supporting ring 65 to move toward the lower diaphragm ring 66 until they assume the position shown in Figs. 9 and 10. When the ring 65 reaches its lowermost position the mold is closed about the tire. At the same time the timer starts in operation admitting fluid pressure to the tire and vulcanization commences.

When the vulcanization is completed the upper mold section rises, as shown in Fig. 5, until the tire is freed therefrom, during which interval both diaphragm rings remain in lowered position. When the upper surface of the tire is completely freed of the upper mold section, and while the upper mold section continues its rising movement, the two rings move upwardly jointly, stripping the tire from the lower mold section. As the diaphragm is still distended the tire is supported thereby in the position shown in Fig. 6, at which time tire supporting arms (to be described) move beneath the tire. The two rings 65 and 66 now recede from each other, the ring 65 continuing its rising movement and the ring 66 reversing and moving downwardly to its position in the lower mold section. As the tire is supported at this time, the diaphragm is drawn out between the beads of the tire as shown in Fig. 7. This separating movement continues as shown in Fig. 8 until the diaphragm is completely stripped out of the tire and the tire rests upon the tire supporting arm as shown at the right in Fig. 3.

This peculiar and distinctive movement by which the tire is first shaped and seated in the mold with the diaphragm in contact with the interior of the tire, and then by which the tire is lifted out of the mold and the diaphragm stripped from the tire, is obtained by the mechanism shown more especially in Figs. 9, 10, 13, 14, 15, 17 and 18.

As noted above, the lower end of the shaft 79 is fixed in the block 84. This block is provided with two semi-circular grooves 95 which are preferably lined with friction half-sleeves 95a. On the sides of the block are the two semi-circular plates 96, also preferably lined with friction half-sleeves 96ª, and these elements complete vertical guideways in which the parallel shafts 86 are received and in which they may move at the proper times. Each plate 96 is held with the sleeves 95ª and 96ª in close fitting relation to a shaft 86 by bolts 98 fixed in the block and projecting through the plates 96. Coil springs 99 held under the requisite compression by nuts 100 on the ends of the bolts maintain the proper yielding grip between the block 84 and the shafts 86 so that the joint and separate movements of the rings 65 and 66 may be obtained.

To the left side of the block 84, as viewed in Figs. 10 and 15, is welded the relatively long flat plate 102, the lower edge of which is formed with a cam surface 102ª, the configuration of which is shown in Fig. 17. This plate may be conveniently termed the raising cam for it is by this element that the diaphragm supporting rings are raised.

The lowering of the diaphragm ring 66 is accomplished by a second cam which may be referred to as the lowering cam. This is a plate 104 having a cam surface 104ª on its upper edge. This lowering cam is located to the right of the block 84. It is welded to two connecting webs 105 which are in turn welded to sleeves 106 which are clamped in the proper position on the shafts 86 by bolts 107.

The frictional contact between the shafts 86 and the block 84 exerted by the springs 99 is sufficient to cause the rings 65 and 66 to move in unison when there is no counter-force acting on the cam 104, such as when the rings are being lifted by the cam 102, but when the upper ring is being moved downwardly during the closing of the press and when the ring 66 is being moved downwardly to strip the diaphragm this frictional contact will permit the shafts 86 to slide in the ways provided for them in the block by the grooves in the ends of the block 84 and the cap plates 96.

The raising cam 102 is actuated by a roller 110 carried on the end of a pin 111 projecting beneath the cam from a crank arm 112 secured to the end of the shaft 17. When the press is closed as shown in Fig. 10 this roller 110 is somewhat below the surface 102ª so as to allow for the interval during which the upper mold section rises to clear the tire (Fig. 5). Then the roller, which is moving in a counter-clockwise direction, strikes the flat lower edge of the cam plate and this causes the entire assembly of diaphragm supporting rings to rise, lifting the tire from the mold. The upward movement of the cam plate 102 continues until the ring 65 reaches its upper limit and at or near this point the cam surface 102ª is relieved as shown in Fig. 17 so that the roller 110 follows the arc 102ᵇ but there is no lifting movement of the ring 65 although the upper mold section continues to rise. While the roller 110 is in contact with the surface 102ª it serves to support the upper diaphragm ring.

It will be noted that as the assembly rises, the lowering cam 104 rises with it until the cam is arrested by its actuating means and is moved thereby in the opposite or downward direction to strip the diaphragm out of the tire in conjunction with the continued upward movement of the ring 65.

To the inner end of the shaft 16 is attached the crank arm 114, the outer end of which carries the roller 115 which toward the latter part of the opening movement wipes over the horizontal surface of the cam 104 and moves the shafts 86, together with the lower diaphragm ring, downwardly to its seat in the mold. The cam surface terminates in a rising formation 104ᵇ which serves to hold the lower diaphragm ring in its seated position during the final opening movement of the press.

It will be noted that on the closing movement the roller 115 returns to the position shown in Fig. 17 and at the same time the upper mold section acting against the ring 65 restores the cam plate 102 to the position shown in the same view.

*The tire-supporting arms*

Just prior to the step of stripping the diaphragm from the interior of the tire, means are provided which pass beneath the tire to hold it from being pulled down toward the lower mold section as the diaphragm is withdrawn. These elements also support the tire out of contact with the heated lower mold section so that there is no danger of overcuring one side of the tire. The means for actuating these tire supporting devices are shown more particularly in Figs. 11, 18 and 19.

Located near the upper corners of the housing just below the mold are two parallel shafts 120. To the ends of each shaft 120 are connected two upwardly extending arms 121 which pass through slots 119 in the bed plate 1. The ends of the slots 119 arrest the arms 121 at either end of their movement. Extending across each pair of arms is a long transverse roller 122 which is located to the side of the mold when the arm is at its outer limit of movement. These arms are rocked inwardly as the mold opens and move to a position so that the two rollers pass well beneath the tire as shown in Figs. 7 and 8. It is advisable to provide for adjusting the height of the roller 122 so as to take care of different sizes of tires, the drawing showing a pair of bearing holes 124 in each arm to receive one end of the roller 122.

It is necessary to rock the arms 121 inwardly at a time so that they will reach their innermost position just before the lower ring 66 begins its downward movement, and also to rock the arms outwardly as the mold closes so as to clear the upper mold section.

In order to perform these operations each shaft 120 is keyed to a friction drive disk 125 and facing this disk and slidably mounted on the shaft is a second friction driving disk 126. Bolts 128 fixed in the disk 125 extend through the disk 126 and carry springs 128a which force the disks toward one another. Between the two friction surfaces and held thereby so as to exert driving torque to the shaft 120 is the enlarged curved end of a pivoted driving arm 130 (see Fig. 19).

One of the arms 130 is pivotally mounted on a bearing 129 on the shaft 38 while the other arm 130 is pivotally mounted on a shaft 133 provided for that purpose between two of the webs 3.

As shown in Figs. 11 and 18 these arms extend toward each other and carry at their inner ends cam rollers 131 which are held against the edges of the cams 134 and 135 by springs 132 and by which the arms 130 and thence the arms 121 are moved at the proper times to move the rollers 122 into and out of tire supporting position.

The crank arm 112 is the means selected for supporting and driving the cams which actuate the mechanism described. The rollers 131 ride on the edges of the two cam plates 134 and 135 shown in Fig. 18 which are mounted over central bosses on the crank arm. The cam plates are fastened to the crank arm by pins 136 and by the pin 111 which forms the mounting for the roller 110. When the arms are in the position shown in Fig. 11, which is when the press is closed, the arms 121 are spread apart, but as the press opens the cams rock the outer extremities of the arms 130 in the direction of the arrows in Fig. 11, which through the friction drive moves the rollers 122 inwardly to their tire supporting positions. The friction drive for the arms 121 is desirable so as to avoid any breakage of the mechanism in the event the tire or some other obstacle should accidentally get in the path of the rollers 122. Also, the friction drive permits the arms 130 to continue to move after the tire supporting arms are arrested at the inner limits of their movement by the ends of the slots 119. This provides for a quick return of the arms at the beginning of the press closing movement.

The timing disk

It is necessary that the press motor 8 be arrested at the extremes of movement and also that the automatic timing mechanism, which controls the period that the press is closed and also the introduction and release of the pressure medium, be set in motion when the press is closed. Equipment for these purposes is not illustrated or described as any one skilled in the art may supply the necessary mechanism.

It is advisable, however, to describe the means on the press which actuates these devices at the proper points. It is desirable in this particular press to arrest the movement of the press at an intermediate point and preferably just as the upper mold section contacts the upper diaphragm ring and edge of the band to permit the operator to determine that the tire band is properly seated before the press closes upon it. If the band is properly seated, he presses the starter switch (not shown) a second time and the press then closes about the tire. The press will stop at the same point on the return to allow the operator to check again before it opens fully, but this second intermediate stoppage is not so essential and may be eliminated.

We have already referred to the control box 9 which is provided with a limit switch 9ª and a timer switch 9ᵇ. As shown in Fig. 20 these switches are at different levels and spaced laterally. The switch 9ª actuates a circuit breaker which when depressed opens the circuit to the motor 8. The switch 9ᵇ is normally open, but when depressed closes the circuit to the timing mechanism and remains closed until the timer completes its cycle and starts the motor 8 in reverse to open the press.

The disk which carries the switch actuating means is indicated at 140 and as shown in Fig. 20 is located with its plane midway between the switches 9ª and 9ᵇ so that the switch 9ª is to the left of the disk and the switch 9ᵇ to the right of the disk as shown in this view. The disk 140 is mounted over the hub of the crank arm 114 to which it is secured by bolts 141. The disk has three projecting arms 142, 143 and 144. One arm 142, which is adjacent the control box 9 when the press is closed, carries two rollers 142ª and 142ᵇ projecting from opposite sides thereof, the roller 142ª opening the switch 9ª and the roller 142ᵇ closing the switch 9ᵇ when the press is fully closed. This position is illustrated in Fig. 9.

The arm 143 carries the roller 143ª on the same side as roller 142ª and this roller strikes the switch 9ª when the press is in its intermediate position so as to permit the operator to inspect the condition of the band or tire before the press opens or closes completely.

The arm 144 carries the roller 144ª in position to depress the switch 9ª when the press is fully opened and this completes the cycle of operation.

Résumé

It is believed that the operation of the new press will have been made clear from the foregoing and a brief résumé only will be given.

When the operator presses the starter button the press starts to close. At this time the arms 121 are withdrawn to their outer limits and remain in that position until the stage shown in Fig. 6. The shaft 53 which is then at the lower limit of its travel begins to rise by the operation of the cam 34 and this action through the links 58 moves the toggle links to their vertical positions, and at the same time brings the upper mold section into parallelism with the lower mold section. At this point it is desirable to arrest the press which is done by the roller 143ª. If, on checking conditions, it is found that the band is correctly placed the operator starts the press again and the continued movement of the bull gears 20 and the downward movement of the shaft 53 brings the upper mold section in a straight line to its closed position the motor stops and the timing mechanism begins to function. At a point shortly after the upper mold section starts to move downwardly it contacts the ring 65 and carries that element with it, at the same time forming the tire and causing the diaphragm to fill out the tire cavity, until the tire is fully seated in the closed mold. The frictional engagement of the shafts 86 with the block 84 permits the upper ring to move downwardly although the lower ring is stationary, being seated in the lower mold section.

After the requisite interval for vulcanization which is set by the timing mechanism, the mold starts to open in the manner previously described and the first action is to raise the upper mold section and thereafter to lift the tire out of the mold by the joint movement of the diaphragm rings acting under the influence of the cam 102 and crank 112. The tire supporting arms now move inwardly, and the upper diaphragm ring continues to rise while the lower diaphragm ring lowers through the action of cam 104 and crank 114, stripping the diaphragm from the tire. After the diaphragm rings are spread to their full extent these elements come to rest, but the upper mold section continues to rise until the limit switch is actuated by the roller 144ª, which brings the press to a stop. The workman removes the cured tire and places a new band B in position ready for the next operation.

It will be appreciated that the foregoing description has been quite detailed, so as to make the essential elements understandable to those skilled in the art, but many of the details may be changed or modified without affecting the basic principles and main features of invention described herein. While the peculiar movement of the upper mold section is preferred because it insures plenty of space for the operator to perform the necessary operations of placing the band and removing the tire, this is not essential as a straight line movement throughout may be substituted. The momentary stoppage of the press before final closing is also desirable but not absolutely necessary. The means for expanding the tire provides for circulation of the heated pressure medium but some manufacturers prefer a single conduit for this pressure. Other modifications will suggest themselves which will not affect the operation of the invention.

For the sake of simplicity and directness the stationary mold section will often be referred to in the claims as the lower mold section and the movable section as the upper mold section, but these terms are relative only for the press may be reversed without affecting the operation of the invention in any way. For further convenience and brevity the press may be designated as a tire shaping and vulcanizing press of the diaphragm type which will be understood to cover any press of the type in which a permanent diaphragm is employed in lieu of the conventional air bag system.

What is claimed is:

1. A press for shaping and curing pneumatic tires comprising two relatively movable mold sections, means for moving at least one of said sections in a direct axial line during the period that the press is approaching its closed position, a flexible diaphragm within the press, two diaphragm supporting rings secured to the edges of the diaphragm, one of said rings having an annular seat for an edge of the tire means to separate the rings during opening of the press, and yieldable means to hold the rings in spaced relation while the press is open, but to permit them to approach as the press is closed, one of said rings being in the path of the movable mold section while the rings are in spaced relation and movable thereby toward the other ring against the resistance of said yieldable means as the press closes.

2. A press for shaping and curing pneumatic tires comprising two relatively movable mold sections, means for moving at least one of said sections in a direct axial line during the period that the press is approaching its closed position and during the beginning of its opening movement, a flexible diaphragm within the press, two diaphragm supporting rings secured to the edges of the diaphragm, means to hold the rings in spaced relation when the press is open but to permit them to approach as the press is closed, one of said rings being in the path of the movable mold section and moved thereby toward the other ring as the press closes, and means operative during the opening movement of the press to move said rings in the same direction to lift the tire out of the mold, and then in opposite directions to extract the diaphragm from the tire.

3. A press for shaping and curing pneumatic tires comprising two relatively movable mold sections, means for moving at least one of said sections in a direct axial line during the period that the press is approaching its closed position and during the beginning of its opening movement, a flexible diaphragm within the press, two diaphragm supporting rings secured to the edges of the diaphragm, means to hold the rings in spaced relation when the press is open but to permit them to approach as the press is closed, one of said rings being in the path of the movable mold section and moved thereby toward the other ring at the press closes, and means operative during the opening movement of the press to move said rings in the same direction to lift the tire out of the mold, and then in opposite directions to extract the diaphragm from the tire, and a tire engaging device movable to hold the tire while the diaphragm is stripped from the tire.

4. A press for shaping and curing pneumatic tires comprising two relatively movable mold sections, means for moving at least one of said sections in a direct axial line during the period that the press is approaching its closed position and during the beginning of its opening movement, a flexible diaphragm within the press, two diaphragm supporting rings secured to the edges of the diaphragm, means to hold the rings in spaced relation when the press is open but to permit them to approach as the press is closed, one of said rings being in the path of the movable mold section and moved thereby toward the other ring as the press closes, and means operative during the opening movement of the press to move said rings in the same direction to lift the tire out of the mold, and then in opposite directions to extract the diaphragm from the tire, tire supporting means located outside of the mold while it is closed but movable into the mold cavity and beneath the tire when the mold is open, and means to move said supporting means concurrently with the opening and closing of the mold.

5. In a press for shaping and curing pneumatic tires, a two part mold, means to open and close the mold, a flexible diaphragm, two rings to which the edges of the diaphragm are secured, means to draw the rings together during the closing of the mold, means to move the rings concurrently after the mold starts to open to strip the vulcanized tire from the part of the mold with which it is in contact, and means to spread the rings apart and extract the diaphragm from the tire after the tire is out of contact with both mold sections.

6. In a press for shaping and curing pneumatic tires a two part mold, means to open and close the mold, a flexible diaphragm, two rings to which the edges of the diaphragm are secured, means to draw the rings together during the closing of the mold, means to move the rings concurrently after the mold starts to open to strip the vulcanized tire from the part of the mold with which it is in contact, and means to spread the rings apart and extract the diaphragm from the tire after the tire is out of contact with both mold sections, and means movable from a position outside of the mold to a position beneath the tire before the diaphragm is stripped from the interior of the tire.

7. In a tire shaping and vulcanizing press of the permanent diaphragm type, a two part mold, two diaphragm supporting rings movable toward and from each other during the opening and closing of the mold, a diaphragm the edges of which are secured to the rings, means to move said rings concurrently after the mold is opened to move the tire out of contact with the mold, means to separate the rings thereafter to withdraw the diaphragm out of the tire, and a tire holding device movable into contact with the tire before the diaphragm is stripped from the interior of the tire.

8. In a tire shaping and vulcanizing press of the permanent diaphragm type, a two part mold, two diaphragm supporting rings movable toward and from each other during the opening and closing of the mold a diaphragm the edges of which are secured to the rings, means to move said rings concurrently after the mold is opened to move the tire out of contact with the mold, means to separate the rings thereafter to withdraw the diaphragm out of the tire, and pairs of tire supporting arms located outside of the mold cavity when it is closed, and means to move said arms into the mold cavity and beneath the tire after it is out of contact with the mold but before the rings are separated.

9. In a tire shaping and vulcanizing press of the permanent diaphragm type, a two part mold, two diaphragm supporting rings movable toward and from each other during the opening and closing of the mold, a diaphragm the edges of which are secured to the rings, means to move said rings concurrently after the mold is opened to move the tire out of contact with the mold, means to separate the rings thereafter to withdraw the diaphragm out of the tire, and a tire engaging device located outside of the mold when it is closed, and means to move said device into the mold cavity and into engagement with the tire after it is out of contact with the mold but before the rings are separated.

10. A tire shaping and vulcanizing press comprising two mold sections, one of said sections being stationary, means to move the other section in a straight axial line during the later part of the press closing movement and the fore part of the press opening movement, a flexible and expansible diaphragm within the mold sections about which the tire is shaped and vulcanized, a diaphragm supporting ring attached to each edge of the diaphragm, means to move both rings simultaneously after the press starts to open to remove the vulcanized tire from the stationary mold section and means acting after the tire is free of the stationary mold section to reverse the direction of movement of one of the rings but to continue the movement of the other ring in the same direction until the diaphragm is stripped from the tire.

11. A tire shaping and vulcanizing press comprising two mold sections, one of said sections being stationary, means to move the other section in a straight line toward and away from the stationary section during the period when the mold sections are approaching their closed position, or as they are separating, a flexible diaphragm within the mold sections, a diaphragm supporting ring attached to each edge of the diaphragm, a seat for each ring in each mold section, means acting after the mold sections have separated to move both rings simultaneously in the same direction to remove the tire from the stationary mold section, and means acting on one of the rings to return it to its seat in the stationary mold section while the other ring is continuing its movement until the diaphragm is stripped from the tire.

12. A press for shaping and vulcanizing a flat tire band comprising a lower stationary tire mold section and an upper movable tire mold section, means to move said upper section to open and close the mold cavity, a flexible diaphragm within the mold cavity, an upper ring attached to one edge of the diaphragm, a seat for said upper ring in the upper mold section, a lower ring attached to the other edge of the diaphragm, said lower ring having a ledge to support the lower edge of the tire band, a seat for said lower ring in the lower mold section, said upper mold section being movable into contact with the upper ring during the downward movement of the upper mold section, means to guide the upper mold section in a straight line toward the lower mold section during the remainder of its closing movement, and means to raise both rings concurrently after the press is opened, and prior to separation of said rings, to lift the vulcanized tire from the lower mold section.

13. A press for shaping and vulcanizing a flat tire band comprising a lower stationary tire mold section and an upper movable tire mold section, means to move said section to open and close the mold cavity, a flexible diaphragm within the mold cavity, an upper ring attached to one edge of the diaphragm, a seat for said upper ring in the upper mold section, a lower ring attached to the other edge of the diaphragm, said lower ring having a ledge to support the lower edge of the tire band, a seat for said lower ring in the lower mold section, said upper mold section being movable into contact with the upper ring during the downward movement of the upper mold section, means to guide the upper mold section in a straight line toward the lower mold section during the remainder of its closing movement, means to raise both rings concurrently after the press is opened, and prior to separation of said rings, to lift the vulcanized tire with the diaphragm in place therein out of the lower mold section, and means acting after the tire is freed of the lower mold section and during continuance of the press-opening cycle to return the lower ring to its seat in the lower mold section.

14. A press for shaping and vulcanizing a flat tire band, comprising a lower stationary tire mold section and an upper movable tire mold section, means to move said section to open and close the mold cavity, a flexible diaphragm within the mold cavity, an upper ring attached to one edge of the diaphragm, a seat for said upper ring in the upper mold section, a lower ring attached to the other edge of the diaphragm, said lower ring having a ledge to support the lower edge of the tire band, a seat for said lower ring in the lower mold section, said upper mold section being movable into contact with the upper ring during the downward movement of the upper mold section, means to guide the upper mold section in a straight line toward the lower mold section during the remainder of its closing movement, means to raise both rings after the press is opened to lift the vulcanized tire out of the lower mold section and means acting after the tire is freed of the lower mold section to return the lower ring to its seat in the lower mold section, without arresting the continued upward movement of the upper ring whereby the diaphragm is stripped from the tire.

15. A press as set forth in claim 14 having a tire support, and means to move the tire support beneath the tire before the lower ring returns to its seat.

16. A press for shaping a tire band to tire form and vulcanizing it in that form having two separable mold sections movable toward and from one another, a flexible and expansible diaphragm located within the interior of the band, and means to supply fluid under pressure to the interior of the diaphragm, and means for manipulating the diaphragm comprising two rings, each attached to one edge of the diaphragm, an operative connection between said rings which causes the rings to move in unison or permits relative movement thereof, and means to move said rings in unison to remove the tire from the mold and thereafter to spread the rings apart to strip the diaphragm from the tire.

17. A press for shaping a tire band to tire form and vulcanizing it in that form, said press having a lower mold section, an upper mold section movable toward and from the lower section to complete the tire molding cavity, a flexible and expansible diaphragm within the mold over which the band is telescoped when the press is open, an upper ring secured to one edge of the diaphragm, a lower ring secured to the other edge of the diaphragm, a protruding ledge on the lower ring to support the lower edge of the tire band, a yielding connection between the two rings which causes the rings to move in unison or permits relative movement thereof, means operative after the press starts to open to cause the rings to move in unison to lift a vulcanized tire from the lower mold section and a lowering device acting in the lower ring to move it downwardly after the tire is elevated above the lower mold section.

18. A press for shaping a tire band to tire form and vulcanizing it in that form, said press having a lower mold section, an upper mold section movable toward and from the lower section to complete the tire molding cavity, a flexible and expansible diaphragm within the mold over which the band is telescoped when the press is open, an upper ring secured to one edge of the diaphragm, a lower ring secured to the other edge of the diaphragm, a protruding ledge on the lower ring to support the lower edge of the tire band, a yielding connection between the two rings which causes the rings to move in unison or permits relative movement thereof, a lifting device operative after the molds are opened to raise both rings in unison to lift a vulcanized tire from the lower mold section and a lowering device acting on the lower ring to move it downwardly after the tire is elevated above the lower mold section without interrupting the operation of the lifting device.

19. A press for shaping a tire band to tire form and vulcanizing it in that form, said press having a lower mold section, an upper mold section movable toward and from the lower section to complete the tire molding cavity, a flexible and expansible diaphragm within the mold over which the band is telescoped when the press is open, an upper ring secured to one edge of the diaphragm, a lower ring secured to the other edge of the diaphragm, a protruding ledge on the lower ring to support the lower edge of the tire band, a yielding connection between the two rings which causes the rings to move in unison or permits relative movement thereof, said upper mold section and upper ring having contacting surfaces by which the upper ring is moved downwardly while the press is closing, means operative after the press starts to open to cause the rings to move in unison to lift a vulcanized tire from the lower mold section and a lowering device acting in the lower ring to move it downwardly after the tire is elevated above the lower mold section.

20. A press for shaping a tire band to tire form and vulcanizing it in that form, said press having a lower mold section, an upper mold section movable toward and from the lower section to complete the tire molding cavity, a flexible and expansible diaphragm within the mold over which the band is telescoped when the press is open, an upper ring secured to one edge of the diaphragm, a lower ring secured to the other edge of the diaphragm, a protruding ledge on the lower ring to support the lower edge of the tire band, a yielding connection between the two rings which causes the rings to move in unison or permits relative movement thereof, said upper mold section and upper ring having contacting surfaces by which the upper ring is moved downwardly while the press is closing, a lifting device operative after the molds are opened to raise both rings in unison to lift a vulcanized tire from the lower mold section and a lowering device acting on the lower ring to move it downwardly after the tire is elevated above the lower mold section without interrupting the operation of the lifting device.

21. A press of the type having two mold sections in which a tire is shaped from a flat band to tire form during the closing together of the mold sections and in which a flexible and expansible diaphragm is located within the tire and having means to supply fluid pressure to the interior of the diaphragm when the press is closed, an upper ring attached to one edge of the diaphragm and a lower ring attached to the other edge of the diaphragm, said rings completing a hollow chamber of which the diaphragm constitutes the outer wall, a seat for the lower ring in the lower mold section and means operative after the upper mold section has cleared the tire to raise both rings in unison to strip the tire from the lower mold section and then to return the lower ring to its seat while the upper ring continues to rise.

22. A press as set forth in claim 21 in which the upper ring and the upper mold section have mutually contacting surfaces by which the upper ring is moved toward the lower ring during closing of the mold sections.

23. A press as set forth in claim 21 having means to hold the faces of the mold sections in parallelism during the closing of the press, the upper mold section and the upper ring having mutually contacting surfaces by which the upper ring is moved toward the lower ring while the mold sections are approaching closed position.

24. A tire forming device comprising two rings and a diaphragm secured by its edges to the edges of the rings, a shaft connected to one ring and extending through the other ring, a second shaft connected to the other ring, a block fixed to the first named shaft, a friction clamp attached to the block and engaging the second shaft, means acting on the block to move both shafts in unison, and means acting on the second shaft to overcome the friction of the clamp and move the second shaft independently of the first shaft.

25. A press for forming a flat tire band into tire shape having separable mold sections, means to open and close the press above the band, two superposed rings and a diaphragm secured by its edges to the edge of the rings, a shaft connected to the upper of said rings, a second shaft connected to the lower ring, a yielding connection between the shafts, a cam connected to the first named shaft, a second cam connected to the second named shaft, a drive shaft in the press having means to open and close the mold sections, and cam operating means moved by the drive shaft and acting during the opening movement of the press to contact the first named cam to raise both rings in unison and then to contact the second cam to lower the lower ring independently of the upper ring.

26. A press for forming a flat tire band into tire shape having separable mold sections, means to open and close the press above the band, two superposed rings and a diaphragm secured by its edges to the edges of the rings, a shaft connected to the upper of said rings, a second shaft connected to the lower ring, a yielding connection between the shafts, a cam connected to the first named shaft, a second cam connected to the second named shaft, a drive shaft in the press having means to open and close the mold sections, and cam operating means moved by the drive shaft and acting during the opening movement of the press to contact the first named cam to raise both rings in unison, and then to contact the second cam to lower the lower ring without interrupting the upward movement of the upper ring.

27. A press for forming a flat tire band into tire shape having separable mold sections, means to open and close the press above the band, two superposed rings and a diaphragm secured by its edges to the edges of the rings, a shaft connected to the upper of said rings, a second shaft connected to the lower ring, a yielding connection between the shafts, means acting on the closing movement of the press to force the upper ring toward the lower ring, a cam connected to the first named shaft, a second cam connected to the second named shaft, a drive shaft in the press having means to open and close the mold sections and cam operating means moved by the drive shaft and acting during the opening movement of the press to contact the first named cam to raise both rings in unison, and then to contact the second cam to lower the lower ring independently of the upper ring.

28. A press for forming a flat tire band into tire shape having separable mold sections, means to open and close the press above the band, two superposed rings and a diaphragm secured by its edges to the edges of the rings, a shaft connected to the upper of said rings, a second shaft connected to the lower ring, a yielding connection between the shafts, means acting on the closing movement of the press to force the upper ring toward the lower ring, a cam connected to the first named shaft, a second cam connected to the second named shaft, a drive shaft in the press having means to open and close the mold sections, and cam operating means moved by the drive shaft and acting during the opening movement of the press to contact the first named cam to raise both rings in unison, and then to contact the second cam to lower the lower ring without interrupting the upward movement of the upper ring.

29. A press for shaping and vulcanizing pneumatic tires having an upper and a lower mold section, a diaphragm constituting a pressure retaining element located within the tire when the mold sections are closed, means for lifting the tire with the diaphragm in place therein out of the lower mold section after vulcanization is completed, means operative after the tire is removed from both mold sections for extracting the diaphragm from the tire, and a tire engaging means movable into contact with the tire to hold the tire while the diaphragm is being extracted.

30. A press for shaping and vulcanizing pneumatic tires having an upper and a lower mold section, a diaphragm constituting a pressure retaining element located within the tire when the mold sections are closed, means for lifting the tire out of the lower mold section after vulcanization is completed means operative thereafter to extract the diaphragm from the tire, a tire support and means for moving the support to a position beneath the tire before the diaphragm extracting means becomes operative.

31. A press for shaping and curing pneumatic tires comprising two relatively movable mold sections, means for moving at least one of said sections in a direct axial line during the period that the press is approaching its closed position and during the beginning of the opening movement, a flexible diaphragm within the press, two diaphragm supporting rings secured to the edges of the diaphragm, yielding means to hold the rings in spaced relation when the press is open but permitting the rings to approach as the press closes, means to move one of said rings in parallelism with the movable mold section during the closing movement of the movable mold section and means which becomes operative after the molds are partially opened to move the rings in the same direction to remove the tire from contact with the mold and then in opposite directions to extract the diaphragm from the tire.

32. In a press for shaping and vulcanizing a tire, a two part mold to receive the tire, a diaphragm within the tire and constituting a pressure retaining means, means to separate the tire from the mold sections after vulcanization is completed, and means to extract the diaphragm from the tire said last named means comprising two rings attached to the edges of the diaphragm, and means to move said rings in opposite directions.

33. In a press for shaping and vulcanizing a tire, a two part mold to receive the tire, a diaphragm within the tire and constituting a pressure retaining means, means to separate the tire from the mold sections after vulcanization is completed, a support movable to a position beneath the tire while it is separated from the mold, and means to extract the diaphragm from the tire said last-named means comprising two rings attached to the edges of the diaphragm, and means to move said rings in opposite directions.

34. In a press for shaping and vulcanizing a tire, a two-part mold to receive the tire, a diaphragm within the tire and constituting a pressure retaining means, means to separate the tire from the mold sections after vulcanization is completed, tire holding means movable from the exterior of the mold to a position to engage the tire while it is separated from the mold, and means to extract the diaphragm from the tire said last-named means comprising two rings attached to the edges of the diaphragm, and means to move said rings in opposite directions.

35. In a press for shaping and vulcanizing a tire, a two part mold to receive the tire, a diaphragm within the tire and constituting a pressure retaining means, means to separate the tire from both mold sections after vulcanization is completed and means for extracting the diaphragm from the tire after the tire is separated from both mold sections, said last named means comprising gripping devices attached to the edges of the diaphragm and mechanism to move said gripping devices simultaneously and in opposite directions away from the tire.

36. In a press for shaping and vulcanizing a tire, a two part mold to receive the tire, a diaphragm within the tire and constituting a pressure retaining means, means to separate the tire from both mold sections after vulcanization is completed and means for extracting the diaphragm from the tire after the tire is separated from both mold sections, comprising gripping devices attached to the edges of the diaphragm, and mechanism to move said gripping devices simultaneously and in opposite directions away from the tire, a tire support and means to move the support beneath the tire before the diaphragm is extracted.

37. An apparatus for shaping an unvulcanized tire band and vulcanizing it in tire shape, comprising upper and lower relatively movable mold sections, means for moving said sections toward and from one another to close and open the press, a flexible and expansible diaphragm within the mold sections, upper and lower rings attached to the edges of the diaphragm and constituting therewith a chamber to hold fluid under pressure, a shaft attached to the upper ring and a shaft attached to the lower ring, a block on the first named shaft having a guideway in which the second shaft is received, yielding means to restrain the movement of the second shaft in the guideway, a cam plate attached to the block, a second cam plate attached to the second shaft, a crank movable in unison with the opening movement of the press and so positioned as to engage the first cam plate to lift both rings simultaneously, and a second crank also movable in unison with the operation of the press and so positioned as to engage the second cam plate and move the lower ring downwardly independently of the upper ring.

38. An apparatus for shaping an unvulcanized tire band and vulcanizing it in tire shape, comprising upper and lower relatively movable mold sections, means for moving said sections toward and from one another to close and open the press, a flexible and expansible diaphragm within the mold sections, and upper and lower rings attached to the edges of the diaphragm and constituting therewith a chamber to hold fluid under pressure, a shaft attached to the upper ring, and a shaft attached to the lower ring, a block on the first named shaft having a guideway in which the second shaft is received, yielding means to restrain the movement of the second shaft in the guideway, a cam plate attached to the block, a second cam plate attached to the second shaft, a crank movable in unison with the opening movement of the press and so positioned as to engage the front cam plate to lift both rings simultaneously, a second crank also movable in unison with the operation of the press and so positioned as to engage the second cam plate and move the lower ring downwardly independently of the upper ring, and without interrupting the upward movement of the upper ring.

39. A press in accordance with claim 37 having means operative during the closing movement of the press to move the upper ring downwardly while the lower ring is stationary.

40. A press in accordance with claim 38 having means operative during the closing movement of the press to move the upper ring downwardly while the lower ring is stationary.

LESLIE E. SODERQUIST.

REFERENCES CITED

The following references are of record in the file of this patent:

UNITED STATES PATENTS

| Number | Name | Date |
|---|---|---|
| 1,976,833 | Brundage | Oct. 16, 1934 |
| 2,169,146 | Iverson | Aug. 8, 1939 |
| 2,243,532 | Maynard | May 27, 1941 |
| 2,254,926 | Zimmerman | Sept. 2, 1941 |
| 2,296,800 | Soderquist I | Sept. 22, 1942 |
| 2,328,507 | Soderquist II | Aug. 31, 1943 |